(12) United States Patent
King et al.

(10) Patent No.: US 8,996,914 B2
(45) Date of Patent: Mar. 31, 2015

(54) DATA QUALITY IN A CLOUD BASED SHIPPING TRANSACTION INTEGRATION SYSTEM

(75) Inventors: Edward Scott King, Oakland, CA (US); Martin William Strell, Oakland, CA (US)

(73) Assignee: GT Nexus, Inc., Oakland, CA (US)

( * ) Notice: Subject to any disclaimer, the term of this patent is extended or adjusted under 35 U.S.C. 154(b) by 331 days.

(21) Appl. No.: 13/453,959

(22) Filed: Apr. 23, 2012

(65) Prior Publication Data

US 2013/0283106 A1    Oct. 24, 2013

(51) Int. Cl.
*G06F 11/00* (2006.01)
*G06F 11/32* (2006.01)
*G06F 17/22* (2006.01)
*G06Q 10/08* (2012.01)

(52) U.S. Cl.
CPC .......... *G06F 17/2264* (2013.01); *G06F 11/327* (2013.01); *G06Q 10/083* (2013.01); *G06Q 10/087* (2013.01)
USPC .............................................. 714/20; 714/57

(58) Field of Classification Search
CPC ....... G06F 21/125; G06F 21/51; G06F 21/64; G06F 9/44589; G06F 17/30235; G06F 17/2264; G06F 17/30569; G06F 11/0745; G06F 11/0793; G06F 11/327; G06F 17/2247; G06F 17/227; G06F 17/24; G06F 17/27; G06F 17/2818; G06F 17/2854
USPC ............ 714/15, 20, 21, 49, 57; 715/239, 249, 715/736
See application file for complete search history.

(56) References Cited

U.S. PATENT DOCUMENTS

| | | | |
|---|---|---|---|
| 5,293,310 A | 3/1994 | Carroll et al. | |
| 5,608,874 A * | 3/1997 | Ogawa et al. | 709/246 |
| 6,047,264 A | 4/2000 | Fisher et al. | |
| 6,219,653 B1 | 4/2001 | O'Neill et al. | |
| 6,463,419 B1 | 10/2002 | Kluss | |
| 6,463,420 B1 | 10/2002 | Guidice et al. | |
| 6,658,483 B1 * | 12/2003 | Iwamoto et al. | 709/246 |
| 6,976,007 B1 | 12/2005 | Boucher et al. | |
| 7,386,478 B2 * | 6/2008 | Viswanath | 705/26.82 |

(Continued)

OTHER PUBLICATIONS

"DHL Collaborates with Customers via Viewlocity's E-Business Solution" ("Viewlocity"), May 26, 2000, 2 pages.

(Continued)

*Primary Examiner* — Bryce Bonzo
*Assistant Examiner* — Elmira Mehrmanesh
(74) *Attorney, Agent, or Firm* — Blakely, Sokoloff, Taylor & Zafman LLP (57) ABSTRACT

Files related to shipping transactions are received from participants. Each of the files are processed in a first stage of a multi-stage process that includes attempting to translate the files to generate a translated file and storing an error status for each file in which the translation experienced an error. For those files that are successfully translated, they are processed in subsequent stage(s) including applying application rule(s) to those files and storing an error status for those translated files resulting in an error. A participant may view a summary of those translated files that are associated with an error status. The participant may further view details of an error to be displayed and retrieve the underlying file. The participant may edit the file to correct the issue and republish the modified file to be reprocessed in the stage of the multi-stage process that identified the error.

21 Claims, 8 Drawing Sheets

(56) References Cited

U.S. PATENT DOCUMENTS

| | | | |
|---|---|---|---|
| 7,752,142 B2 | 7/2010 | Bjerre et al. | |
| 7,756,794 B2 | 7/2010 | Bjerre et al. | |
| 7,761,387 B2 | 7/2010 | Bjerre et al. | |
| 7,827,119 B2 | 11/2010 | Bjerre et al. | |
| 7,925,931 B1 * | 4/2011 | Smith et al. | 714/43 |
| 8,108,767 B2 * | 1/2012 | Gaurav et al. | 715/237 |
| 8,225,139 B2 * | 7/2012 | Nussbaum et al. | 714/16 |
| 8,606,965 B1 * | 12/2013 | Parasnis | 709/246 |
| 2002/0099735 A1 * | 7/2002 | Schroeder et al. | 707/513 |
| 2003/0236739 A1 | 12/2003 | Borgeson et al. | |
| 2004/0225751 A1 * | 11/2004 | Urali | 709/246 |
| 2007/0299686 A1 | 12/2007 | Hu et al. | |
| 2008/0072160 A1 * | 3/2008 | Gaurav et al. | 715/758 |

OTHER PUBLICATIONS

The Cloud Supply Chain Data Network, Understanding the Power of a Shared Online Network to Connect Global Partners and Achieve High Data Quality Levels, A GT Nexus White Paper, GT Nexus, Inc., 2010, 7 pages.

* cited by examiner

| Home | Orders | Shipments | Payments | Documents | Exceptions | Integrat |
| File Inspector | File Drop | Transaction Inspector | Milestone Inspector |

File Detail

| | |
|---|---|
| File Name | Ex Filename |
| Organization | Retail Company |
| Processed | 04/04/2012 09:23 PM |
| Type | Purchase Order |
| Message Direction | In |
| Comment | |

Contents
```
DTM*064*20121028
DTM*063*20121105                                    310
TD5****M
N1*AG*No Agent   Domestic*92*30000
N1*ST*OT OB2 Retail*92*28000
N3*8005 POLK LANE
N4*OLIVE BRANCH*MS*38654*US
N1*MF*CK PRODUCTS*92*1396
N3*310 Racquet Drive
N4*Fort Wayne*IN*46825*US
PO1*00001*318*EA*2.19**BP*2672384*VP*HOLIDAY DECO
CTP**RTL*2.95
PID*F****WS Holiday Deco Blend
PO4*6************6
CTT*1*318
SE*28*38250734
315  GE*734*3825
IEA*1*000003825
```

[ Back ] [ Save and Republish ] [ Transaction Inspector ] [ Show Connected Files ]

FIG. 3

File Detail

| | |
|---|---|
| File Name | EX_FILENAME.EDI.2=20+347686944 |
| Organization | Retail Company |
| Processed | 04/04/2012 09:27 PM |
| Type | Purchase Order |
| Message Direction | In |
| Comment | |
| Contents | |

```xml
<?xml version="1.0" encoding="UTF-8"?><OrderMessage>
  <TransactionInfo>
    <MessageSender>Sender /MessageSender>
    <MessageRecipient>SYNEXUS</MessageRecipient>
    <Created>2012-04-05T00:00:00</Created>
    <FileName>17a60875_9fa9c8=250+36848901424+0+0=</FileName>
  </TransactionInfo>
  <Order>
    <Header>
      <OrderNumber>30308172WSK</OrderNumber>
      <OrderDateTime>2012-02-14T12:00:00.000</OrderDateTime>
      <Purpose>Update</Purpose>
      <CustomerCode>WSRTL</CustomerCode>
      <CustomerDepartmentCode>109</CustomerDepartmentCode>
      <CustomerDepartmentName>WS LINENS</CustomerDepartmentName>
      <ShipmentTerms>FOB</ShipmentTerms>
      <TransportationMode>Ocean</TransportationMode>
      <BuyerIdentification>
```

DATA QUALITY IN A CLOUD BASED SHIPPING TRANSACTION INTEGRATION SYSTEM

FIELD

Embodiments of the invention relate to the field of supply chain transactions; and more specifically, to improved management of data in a supply chain transaction.

BACKGROUND

Supply chain transactions such as shipping goods from a seller to a buyer typically involves several parties that may operate different management applications (e.g., Enterprise Resource Planning (ERP)). By way of example, there are multiple parties that interact throughout the lifetime of a shipment. Example parties include the seller (sometimes referred to as the shipper), the buyer, carriers (e.g., ocean carriers, rail carriers, truck carriers, air carriers, etc.), third party logistics providers (3PLS), custom brokers, consolidators, etc. The partners in a supply chain transaction typically send and receive multiple messages during the transaction (e.g., purchase orders, advanced shipping notices, milestone updates (e.g., time the good was shipped, time the good was received, etc.), etc.). Quality of the data, including timely receipt, completeness, and accuracy of the data, is important for the proper functioning of the supply chain transaction.

Traditionally, customers were required to connect with their partners, normalize the data that they provide, and manage the data quality. Typically, connecting with a partner includes agreeing on a communications protocol and format (usually Electronic Data Interchange (EDI)). As the number of partners rise, so does the complexity of connecting them all. If the systems between partners are not the same, then the data is often required to be normalized. For example, if the cargo is arriving from a particular location, normalization ensures that the location is consistently called the same thing by each partner in the transaction. Traditional approaches for normalizing data include creating mapping tables or creating additional capabilities in the sending or receiving computer system. This gets more complex as the supply chain grows and the number of partners increases.

Resources must also be dedicated to monitor the quality of the data (e.g., for accuracy, completeness, and timeliness). Current methods limit editing rights of messages to the senders of data, but the senders have limited visibility into the receiver's integration systems and its data pipeline. When an issue arises, senders often have very little logging or diagnostic information about messages' failure. In cases where there is an error in a message, traditionally only the sender can correct the error, and then must resend the message to the recipient system. In most cases, the personnel doing the resending are information technology (IT) personnel, as opposed to the business users. This process can take days or weeks, as the IT personnel may need to reconstruct the message in its original state and then queue updates to the same record after the original message. Message integration is often a multi-stage process. In a cloud-based system where messages are sent to a cloud-based managed service (e.g., a trade and logistics portal), the senders of the data have limited visibility in the multi-stage process and often cannot determine at which stage an error occurred.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Figure 1:
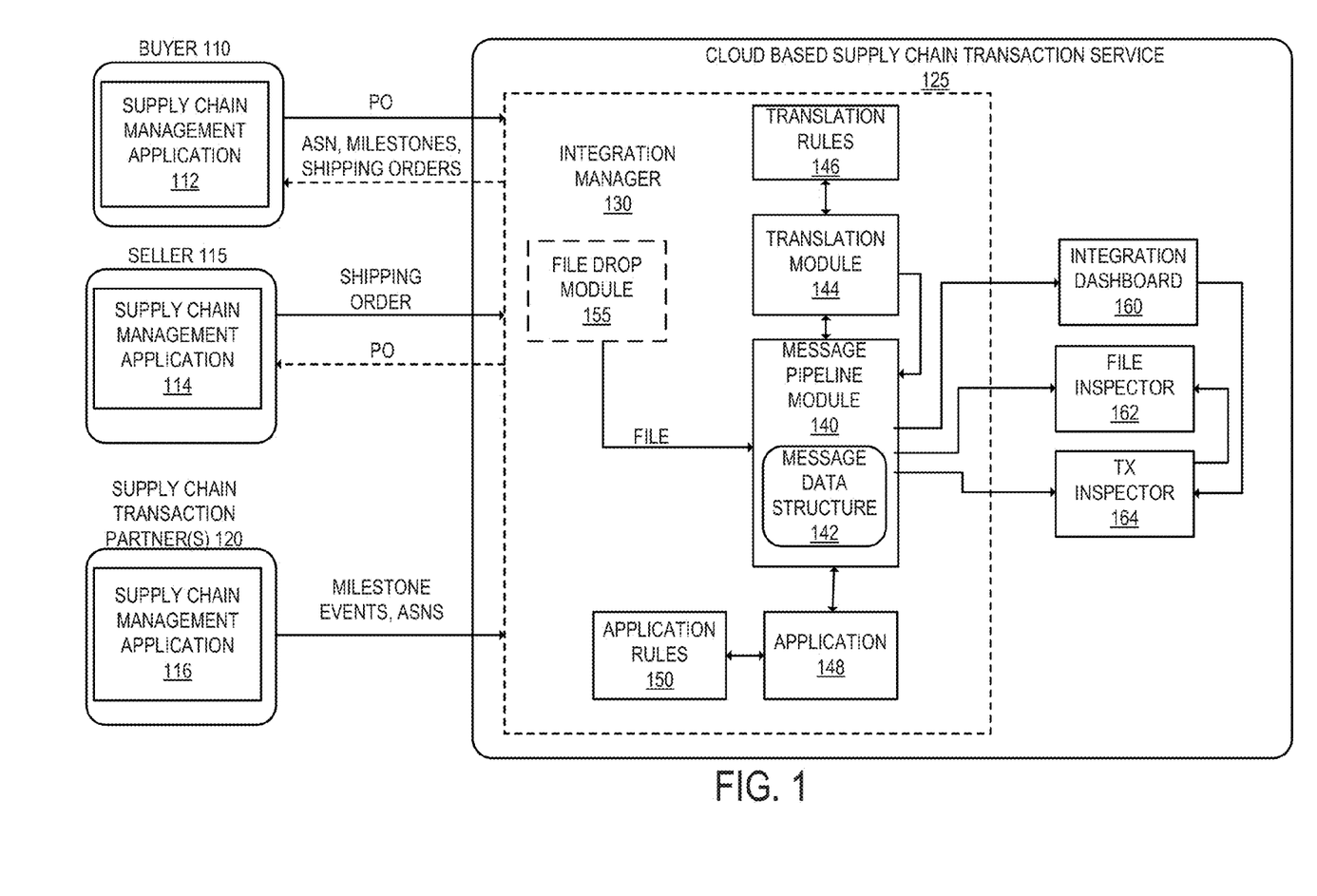
FIG. 1 illustrates an exemplary cloud based service for managing data related to supply chain transactions according to one embodiment.

FIG. 1 illustrates an exemplary cloud based service for managing data related to supply chain transactions according to one embodiment. The system illustrated in FIG. 1 includes multiple parties that participate in supply chain transactions and interact with the cloud based supply chain transaction service 125 to, among other things, improve the data quality in the messages related to supply chain transactions. The cloud based supply chain transaction service 125 allows participants in supply chain transactions to connect to the cloud platform and manage data flow and data quality with the other participants in the supply chain transactions. Example supply chain transaction participants include sellers of goods, buyers of goods, carriers of goods (e.g., ocean carriers, rail carriers, truck carriers, air carriers, etc.), third party logistics providers (3PLs), customs brokers, consolidators, etc. As illustrated in FIG. 1, the buyer 110, the seller 115, and the supply chain transaction partner(s) 120 (e.g., carrier(s), 3PL(s), custom broker(s), consolidator(s), etc.), connect to the cloud based supply chain transaction service 125.

The participants in a supply chain transaction may connect their internal supply chain management application (e.g., their ERP application) with the service 125 such that messages related to supply chain transactions flow through the service 125. Example messages include purchase orders (POs), Shipping Orders, advanced shipping notices (ASNs), bill of ladings, booking requests, milestone updates (e.g., time the goods were shipped, the time the goods were received, etc.), or any other data message related to a supply chain transaction. By way of example and not limitation, the buyer 110 may transmit purchase orders for the seller 115 to be processed through the cloud based supply chain transaction service 125, the seller 115 may transmit shipping orders for the buyer 110 to be processed through the cloud based supply chain transaction service 125, and the supply chain transaction partner(s) 120 may transmit milestone updates for the transactions to be processed through the cloud based supply chain transaction service 125.

The supply chain transaction participants may be operating different supply chain management applications and/or have different terminology for the same data information. For example, as illustrated in FIG. 1, the buyer 110, the seller 115, and the supply chain transaction partner(s) 120 include the supply chain management applications 112, 114, and 116 respectively, which may (and likely are) different from each other, and may use different terminology to refer to the same terms. By way of example, two participants may refer to the same city by using two different terms (e.g., one may abbreviate while the other uses the full name). In addition, even if the supply chain transaction participants are operating according to the Electronic Data Interchange (EDI) standards, these standards evolve over time and may not be strictly adhered to. Also, the supply chain management applications of the supply chain transaction participants may change over time due to new software releases, new systems, data changes, etc. Because of these factors, in one embodiment the cloud based supply chain transaction service 125 normalizes the messages into a common format.

The supply chain transaction service 125 processes the messages received from the supply chain transaction participants for data accuracy, data completeness, and/or timeliness. These messages are processed in a multiple stage process that is referred herein as the message integration pipeline. By way of example, the message integration pipeline may include performing the following: receiving an inbound message from a supply chain transaction participant that may include multiple transactions (e.g., a file that includes multiple purchase orders which may belong to different shipping transactions), splitting the file into the individual files, translating the file(s) into a common format, applying one or more application rules to the translated file(s), and inserting the translated files into a database. The translated files may also be augmented with existing data (e.g., info from an existing PO can be combined with an ASN during translation) prior to being inserted into the database.

As illustrated in FIG. 1, the cloud based supply chain transaction service 125 includes the integration manager 130, which is configured to process messages received from, and/or destined to, the participants in the supply chain transaction. The integration manager 130 includes the message pipeline module 140 that provides visibility and collaborative access into the message integration pipeline.

The message integration pipeline has multiple stages, including a translation stage and a set of one or more application stages. For example, the translation module 144 performs the translation stage which includes translating the received file, which is in a format that is specific to the sender system (typically an EDI file), to a common format according to the translation rules 146 (e.g., into an XML format). The translation rules 146 include information that is specific to the participants of the supply chain transaction and indicate how the messages are to be translated. In one embodiment, administrators of the participants configure the translation rules. In some embodiments, at least some of the translation rules 146 are standard rules that may apply to multiple participants and can be accessed as templates for configuration. Existing translation rules configured by other participants may also be used by a participant when configuring the translation rules.

The translation module 144 may also split the original file into individual files (if the original received file includes multiple files) prior to translating. The translation module 144 may also associate unique identifiers with the files that are used to stitch the files together for end to end visibility of data flow, which will be described in greater detail later herein. The translated files are also stored in the message data structure 142.

The translation module 144 may experience an error or unexpected condition (generally referred herein as an error) when processing the message in the translation stage for any of a number of reasons. By way of example, the translation module 144 may experience an error in the following scenarios: the translation module 144 was unable to recognize the format of the incoming file (e.g., an invalid file format); a required field was missing in the file (e.g., a container number was missing); a field in the file has unexpected data (e.g., a data element in the file has an unexpected size); and a conditional field error exists (e.g., a quantity and a quantity unit code were not provided together). It should be understood that these are example errors that may be experienced and embodiments may experience more errors, less errors, and/or different errors.

After encountering an error, the translation module 144 causes an error status for that file to be associated with the file. The error status may indicate the reason for the error (e.g., a required field was missing). In one embodiment, the error status is stored in a record for the file in the message data structure 142. In another embodiment, an alert or notification (e.g., an email address, a private message, a text message, etc.) is sent to the relevant participants (e.g., the sender of the message, the recipient of the message, etc.) upon encountering an error. In some embodiments, the translation module 144 stores a record of the results of the translation for the file in the message data structure 142.

Sometime after the file is translated successfully, the message pipeline module 140 causes the file to be loaded into the application 148. The application 148 is an application that is related to the shipping transaction and may be different depending on the type of message that is being processed. The application 148 provides data views, alerts and business analytics which allow customers to manage exceptions for shipments in their supply chains. By way of example, the application 148 may be an ASN application that consumes and normalizes ASN data and creates shipments. As another example, the application 148 may be a milestone application that processes milestone data that updates the shipment to track progress of the shipment lifecycle. As yet another example, the application 148 may be a milestone model application that is used to create business rules to customize the application to match the workflow of a customer's specific supply chain.

The application 148 performs the set of application stage(s) of the multi-stage integration, including applying one or more application rules to the translated files. By way of example, the application rule(s) determine one or more of the following: whether the message includes missing data (e.g., a buyer code was not provided in a purchase order); whether the message includes unmapped data (e.g., the carrier code included in a purchase order was not found); whether the message includes a data sequence or timing error (e.g., a shipment identifier was attempted to be created prior to a purchase order existing for the shipment); whether the message includes data that cannot be resolved (e.g., a city included in the message could not be resolved for a particular party); whether the message causes a business logic error (e.g., an attempt to delete a purchase order that has been sufficiently processed that it is no longer possible to delete the purchase order); and whether the message includes a missing party for that type of message (e.g., a shipping party was not included and was required for the message type). It should be understood that these are example application rules and embodiments may include more application rules, less application rules, and/or different application rules.

In one embodiment, administrators of the participants configure the application rules. In some embodiments, at least some of the application rules 150 are standard rules that may apply to multiple participants and can be accessed as templates for configuration.

The application module 148 may experience an error when processing the message in the application stage(s). For example, when the application of the set the application rules 150 to the file indicates an error. After encountering an error, the application module 148 causes an error status for that translated file to be associated with that translated file. The error status may indicate the reason for the error. In one embodiment, the error status is stored in a record for the file in the message data structure 142. In one embodiment, an alert or notification (e.g., an email address, a private message, a text message, etc.) is sent to the relevant participants (e.g., the sender of the message, the recipient of the message, etc.) upon encountering an error.

In some embodiments, the supply chain transaction service 125 also includes a message queuing stage that occurs prior to the translation stage. The message queuing stage uses metadata from the filename to establish processing lanes for the received messages, where each processing lane has its own processing thread and its own queue. The processing lanes may be segmented by supply chain transaction participant and/or message type, which prevents one particular participant and/or message type from affecting the processing of messages from another participant or message type. Also, separating into processing lanes preserves the sequential processing of data, which is important for certain kinds of messages. For example, an error would be generated if a message was processed that attempted to create a shipment identifier prior to the processing of a message for a purchase order for that shipment.

Figure 2:
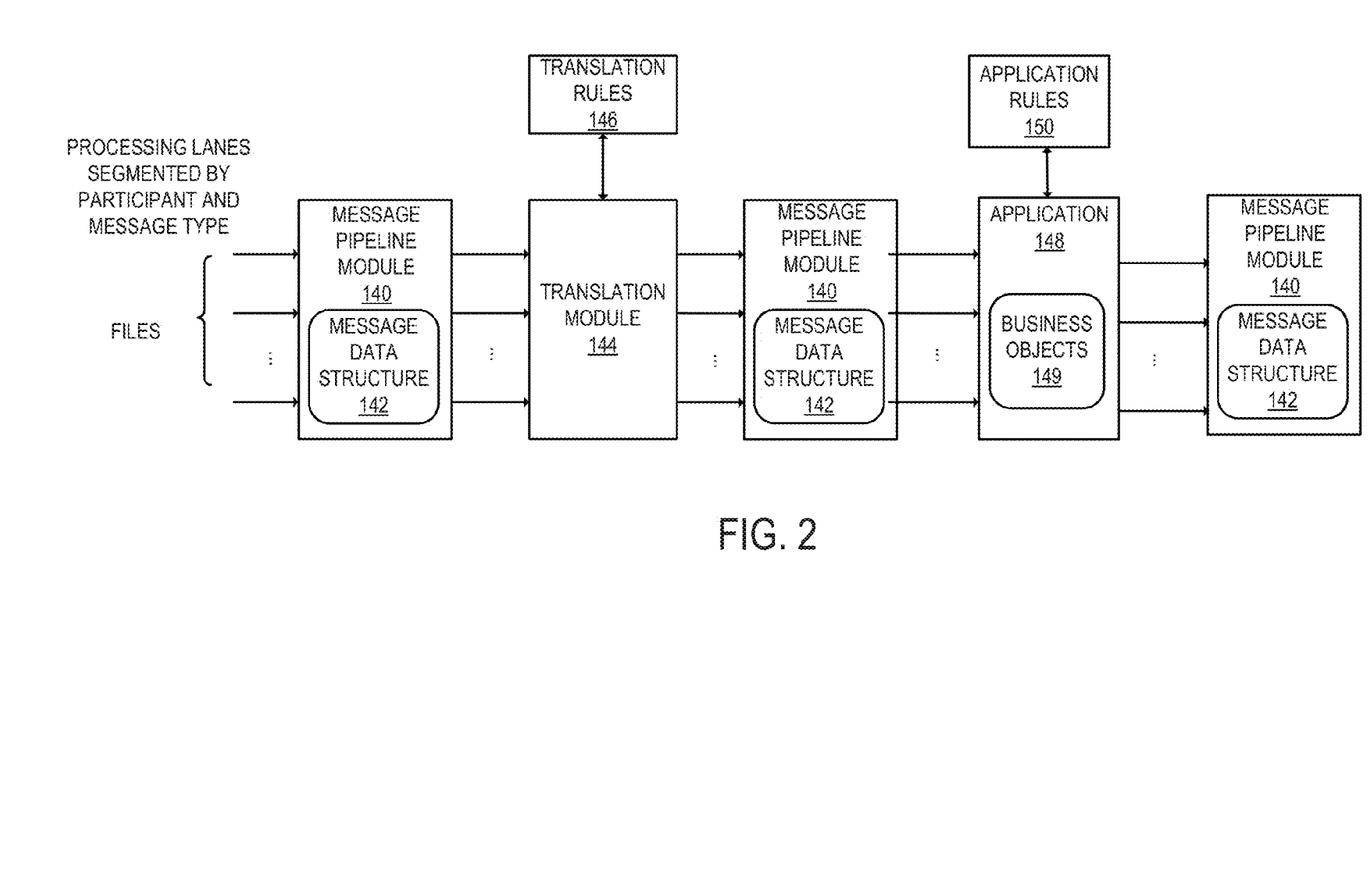
FIG. 2 illustrates the flow of messages through the message integration pipeline according to one embodiment.

FIG. 2 illustrates the flow of messages through the message integration pipeline according to one embodiment. Files are received at the message pipeline module 140 from the participants, typically from a supply chain management application (e.g., an ERP application) of a supply chain transaction participant. The files are written to the message data structure 142 with the time stamp of receipt and a unique tracking identifier. Processing lanes are established that are segmented by supply chain transaction participant and message type. The translation module 144 accesses the files and translates it to the common form using the translation rules 146. The translation module 144 may, if the original file included multiple files, break the file into separate files. The translation module 144 writes the translated files to the message data structure 142 with a time stamp of the translation and the same unique tracking identifier. The translation module 144 also writes the status of the translation to the record for the translated file in the message data structure 142.

The translated file is then loaded into the application 148 where the application 148 applies the application rules 150 to convert the files into business objects 149. The application 148 writes a timestamp of when the translated file was processed (successful or otherwise) and also adds a unique processing stage identifier. The application 148 stores an error status in the message data structure 142 for those translated files in which the application of the application rules 150 indicated an error.

FIG. 2 illustrates the flow of incoming messages through the message integration pipeline. In other embodiments, the message integration pipeline also includes the processing of outgoing messages. For example, in some embodiments, successfully processing a purchase order may automatically cause an ASN to be created for that purchase order and sent to the appropriate receiver, possibly after translating the ASN into the format used by that receiver.

The processing status of the files (both in the translation stage and the application stage(s)) are viewable through the integration dashboard 160. The integration dashboard 160 allows the participants to quickly and easily identify errors, and take steps to resolve those errors. In one embodiment, the integration dashboard 160 is an online dashboard that is accessible through a client network application (e.g., through a web browser, through a dedicated application on a computing device of the participant, etc.). In one embodiment, participants do not have to specify the error type (e.g., they do not have to generate a custom query), type of message, and/or partner as a requirement of viewing the summary information.

The integration dashboard 160 provides a high level summary of the integrations including those integrations that experienced an error in the processing. The integration dashboard 160 can display errors in the translation stage and/or in the application stage(s). For example, the integration dashboard 160 displays a summary of information that indicates the number of files for a particular message type that have encountered an error. In one embodiment, the integration dashboard 160 groups the messages based on the sender of the message, the receiver of the message, and/or the message type. Each grouping also includes a user selectable link that, when selected, displays further details of the error.

The integration dashboard 160 filters the messages that a particular participant is authorized to view. This may include messages sent to the system by the participant, messages directed to the participant, and/or messages that the participant is otherwise authorized to view. For example, each record in the message data structure 142 may be marked with an identifier of each participant that record is visible to. For each participant, the integration dashboard 160 identifies the messages they have visibility to and accesses the records in the message data structure 142 for those messages.

In some embodiments, the integration dashboard 160 may filter the messages that originally processed with errors but later processed without errors to accurately convey the current state of a message and reduce false positives.

In some embodiments, the integration dashboard 160 may notify (e.g., via email, text message, etc.) the participants if the number of daily pre-translation files is below a threshold. This helps identify to a participant if there is a problem with the connection between the participant and the cloud based supply chain transaction service 125 (e.g., there should be more files being received by the service 125 then there are). In some embodiments, the integration dashboard 160 may notify the participants if the difference between pre-translated files and post-translated files are greater than a threshold. This helps identify if the messages are being received by the cloud based supply chain transaction service 125 but are failing in the integration pipeline for some reason.

In one embodiment, for files that experienced an error during processing, a participant that can use the integration dashboard 160 to view details regarding the error and open a text editor to view and edit the message in place and resubmit the message for processing using the cloud based supply chain transaction service 125, without requiring the message to be changed on the supply chain management application of the participant (typically the participant that sent the message) and resubmitted from that application. The participant may be the sender of the message, the receiver of the message, or other participant that has access to the file.

As described above, some files are received as batch files with multiple individual files, typically for different supply chain transactions. These batch files may be separated into their individual files and treated separately. For example, some of these translated files of the batch file may be processed successfully without error and some of them may have an error. An authorized participant can use the integration dashboard 160 to view the errors of only those files that experienced an error, even if part of a larger batch file. As a result, the participant can drill into the specific file with the error, edit it, and republish only that file, without resubmitting the entire original batch file. In this way, the system helps prevent against resubmitting files that are successfully processed, which otherwise might lead to duplicate or incorrect data.

In some embodiments, the system also allows the file to be republished in the stage in which the error occurred. As will be described in greater detail later herein, at each stage in the process the system may associate a unique identifier with the file such that the files may be stitched together for end to end visibility of data flow. This allows the system to keep a record of the versions of the file as it is processed through the integration message pipeline, and allows a participant to identify issues and operate on the specific file that is experiencing the error, and republish the file in the appropriate stage of the integration message pipeline to prevent against duplicate stages or operations occurring.

The transaction inspector 164 displays details regarding selected files, including those that triggered an error during processing in the integration message pipeline. In one embodiment, the transaction inspector 164 is launched as a result of a participant selecting a link in the integration dashboard 160 for a particular grouping. For example, the integration dashboard 160 may display summary information for the ASNs sent by a particular sender to a particular receiver, including an indication of the number of those ASNs that experienced an error, and a link to the transaction inspector 164 that, when selected, displays further details regarding each of those ASNs that experienced an error.

The transaction inspector 164, includes with each record, a link that, when selected, causes the underlying file to be received and displayed (e.g., through the file inspector 162). For example, the file may be displayed in a text editor of the file inspector 162 that allows the participant to edit the file and republish that file. The file inspector 162 may display the original pre-translated file or the translated file. The transaction inspector 164 also allows the participants to navigate from a record to a business object in the system (such as the underlying purchase order or container manifest). The transaction inspector 164 includes the ability to filter out transactions that failed or processed with an error and later were processed successfully. In some embodiments, the transaction inspector 164 includes the ability to search for transactions by reference fields for each object, search errors by text or by code, and/or use template error codes to search for common errors.

Figure 8:
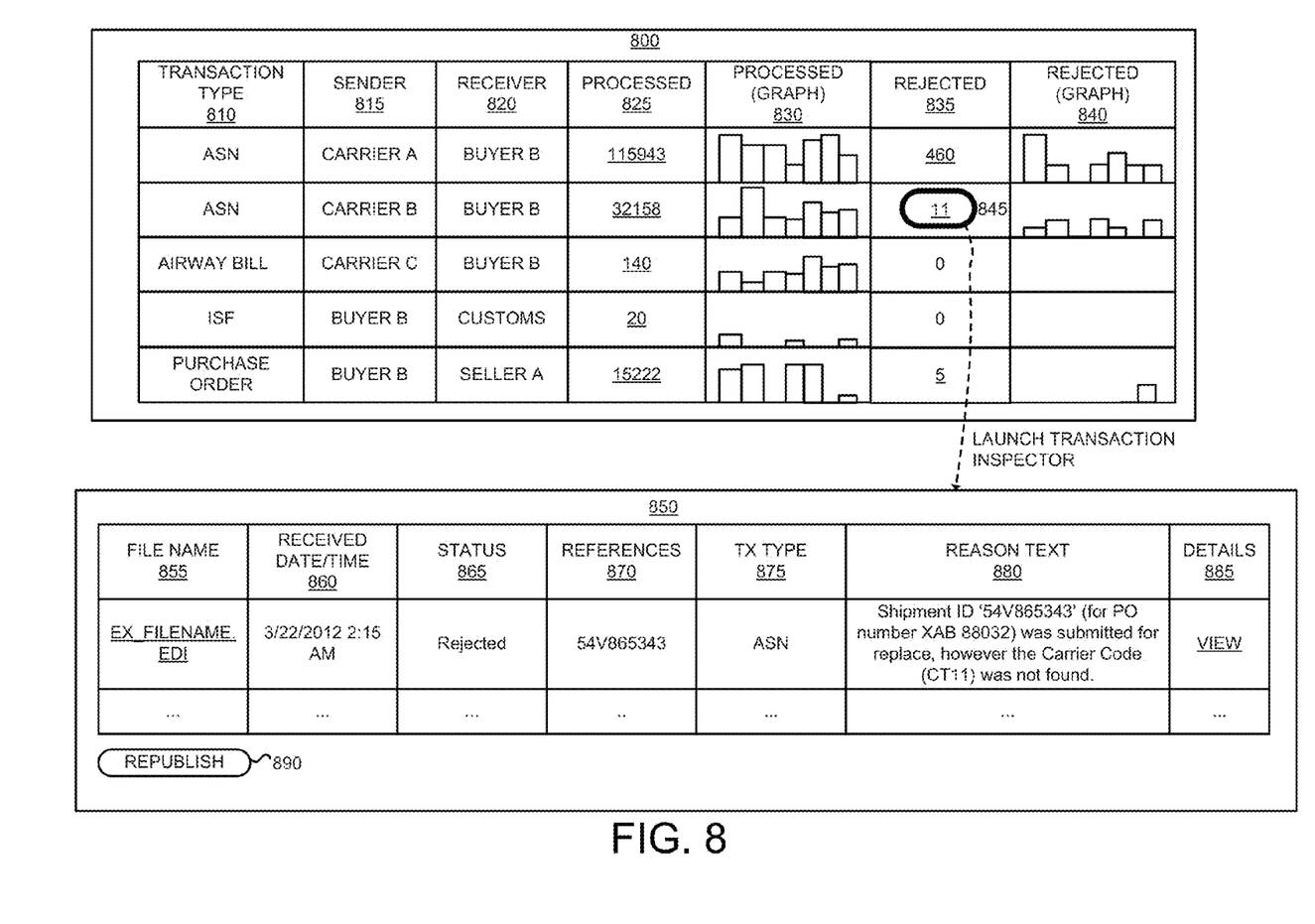
FIG. 8 illustrates an exemplary integration dashboard and transaction inspector displayed for a particular participant according to one embodiment.

FIG. 8 illustrates an exemplary view of the integration dashboard 160 and an exemplary view of the transaction inspector 164 according to one embodiment, which will be described in greater detail later herein.

Figure 3:
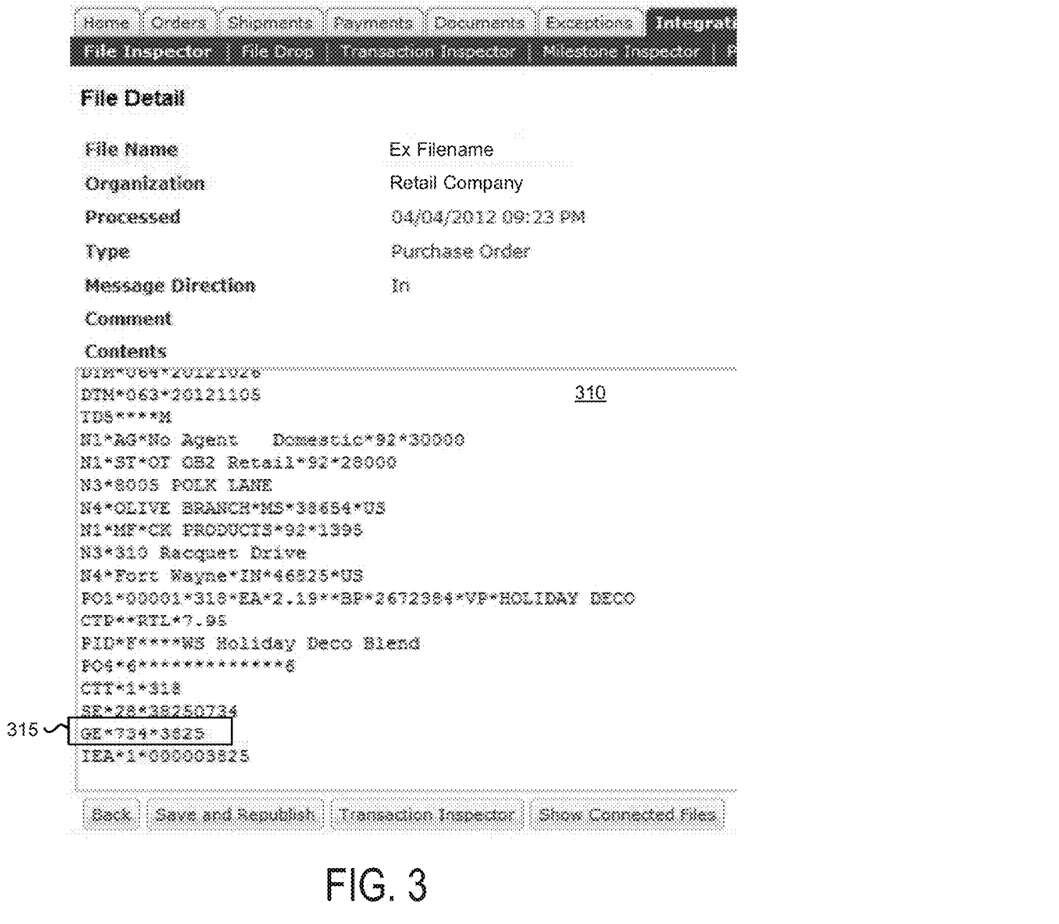
FIG. 3 illustrates an exemplary file that is received into the cloud based supply chain transaction service according to one embodiment.

FIG. 3 illustrates an exemplary file 310 that is received into the cloud based supply chain transaction service 125. The file 310 is a batch file that includes multiple purchase orders, in particular 734 purchase orders 315. The file 310 will be used in examples described herein to illustrate certain aspects of the functionality of the system.

Figures 4, 5:
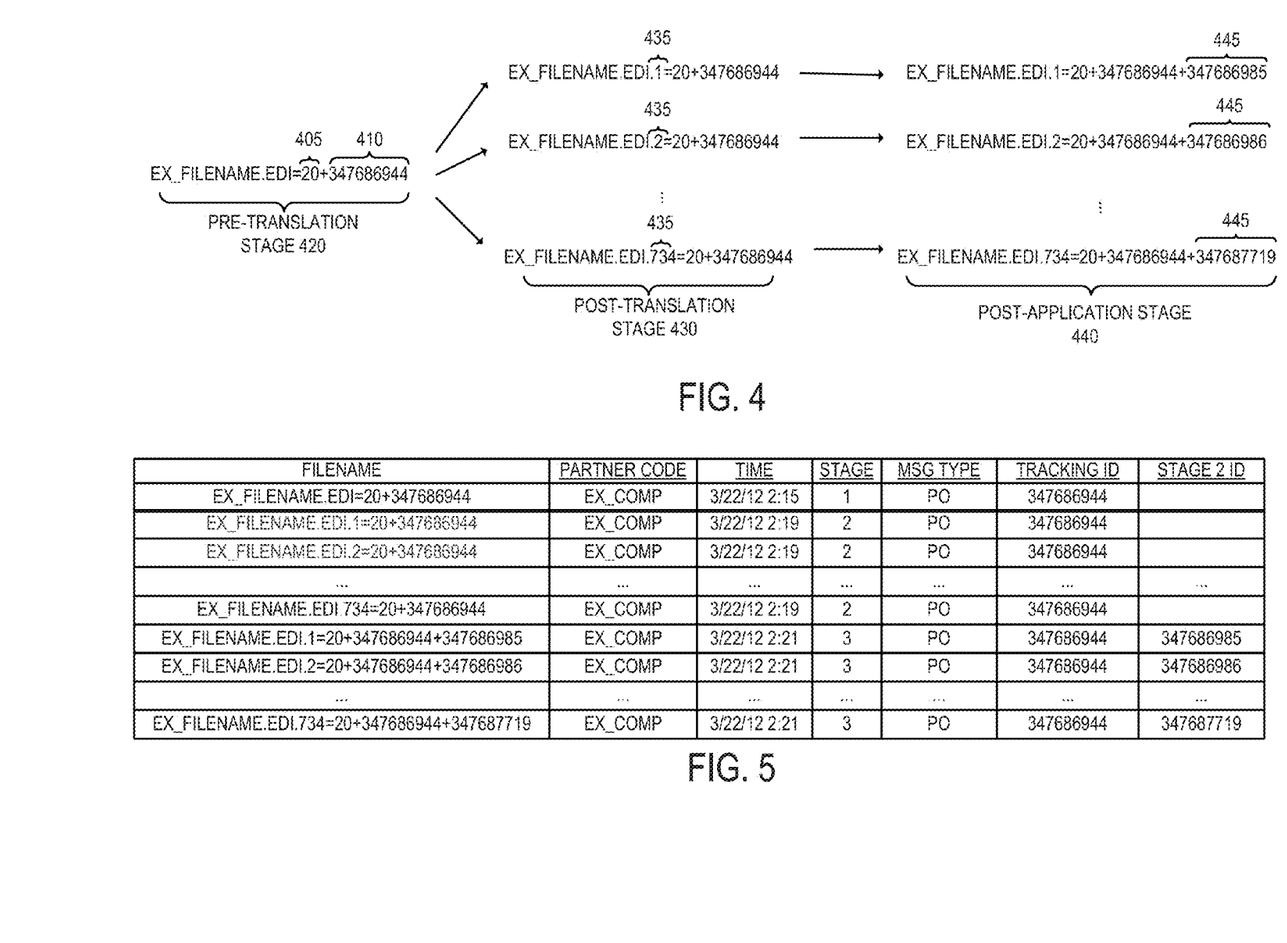
FIG. 4 illustrates the stitching of the file illustrated in FIG. 3 as it is processed through the message integration pipeline according to one embodiment.
FIG. 5 illustrates the records in a message data structure as the file illustrated in FIG. 3 is processed through the message integration pipeline according to one embodiment.

FIG. 4 illustrates the stitching of the file 310 as it is processed through the message integration pipeline. FIG. 4 will be described in reference to FIG. 5, which illustrates the records in the message data structure 142 as the file 310 is processed through the message integration pipeline. As illustrated in FIG. 5, Stage 2 is the post-translated (XML) file, which is loaded into the application. Stage 2 filenames typically have the .xml extension.

At a pre-translation stage 420, metadata is added to the filename of the file 310, which in this example is EX_Filename. In particular, the added metadata includes a pointer 405 to configuration data (20 in the example) and a unique identifier 410 to the filename. A record is added to the message data structure 142 with the filename with added metadata. The record may also includes the partner code (an identifier of the participant that sent the message), a timestamp of when the file was received, a timestamp of when the file was processed, the processing stage, the message type, and the unique identifier (the first stage identifier, which is referred herein as the tracking identifier).

Figure 6:
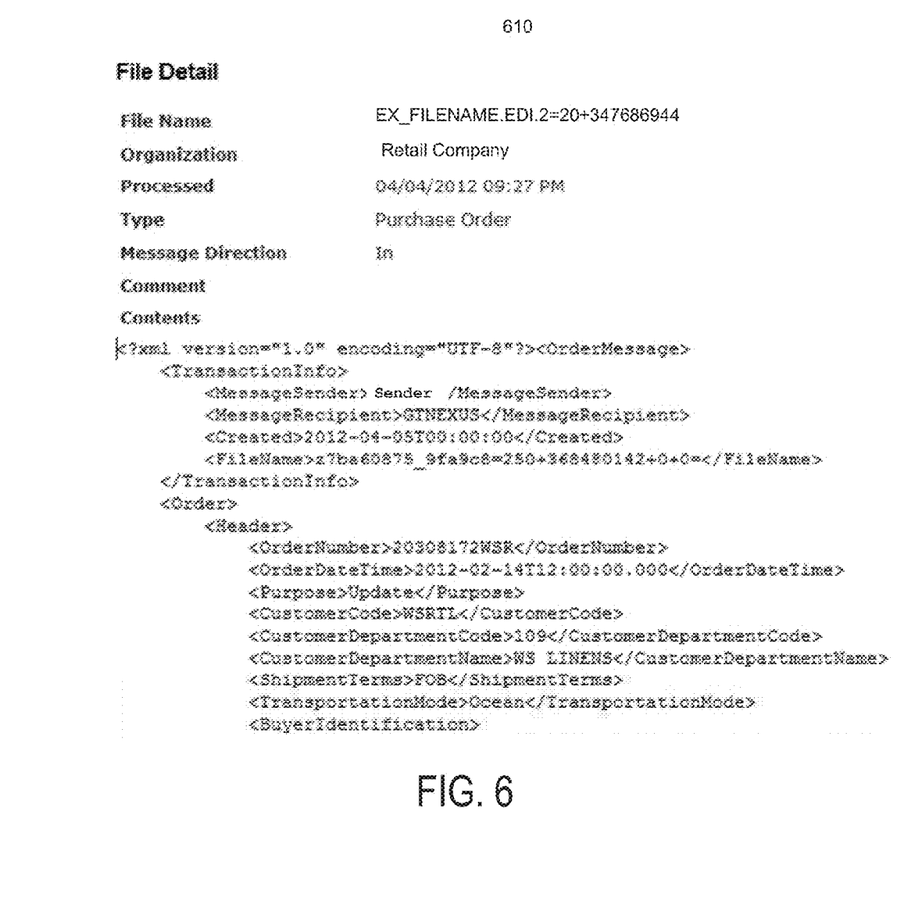
FIG. 6 illustrates an example of a purchase order file separated from the file illustrated in FIG. 3 in its translated form according to one embodiment.

Since the file 310 is a batch file that includes multiple purchase orders, the translation module 144 separates the individual purchase orders from the batch file to create 734 separate files, and then translates the 734 separate files into a common format (e.g., into an XML format). The translation module 144 also adds metadata in a portion 435 of the filename of each file to generate a unique filename for each separated file. It should be noted that the filenames in the post-translation stage 430 include the unique identifier 410. FIG. 6 illustrates an example of one of the purchase order files separated from the file 310 in its translated form according to one embodiment, which has been translated into an XML file. The entire translated file is not illustrated for simplicity reasons.

Assuming that each file was translated successfully (e.g., there was not a fatal error during translation for any of the 734 purchase orders), the application 148 processes the files and adds a processing stage identifier in a portion 445 of the filename to represent the post-application stage 440. Records are added to the message data structure 142 and may include the modified filename, a timestamp of when the file was received, a timestamp of when the file was processed in the stage, a processing stage identifier (in this example stage 2), a message type identifier, the tracking identifier, and the stage two identifier. Although FIGS. 4 and 5 illustrate the results of a single application stage, there may be additional stages and each stage would add another processing stage identifier onto the filename.

Figure 7:
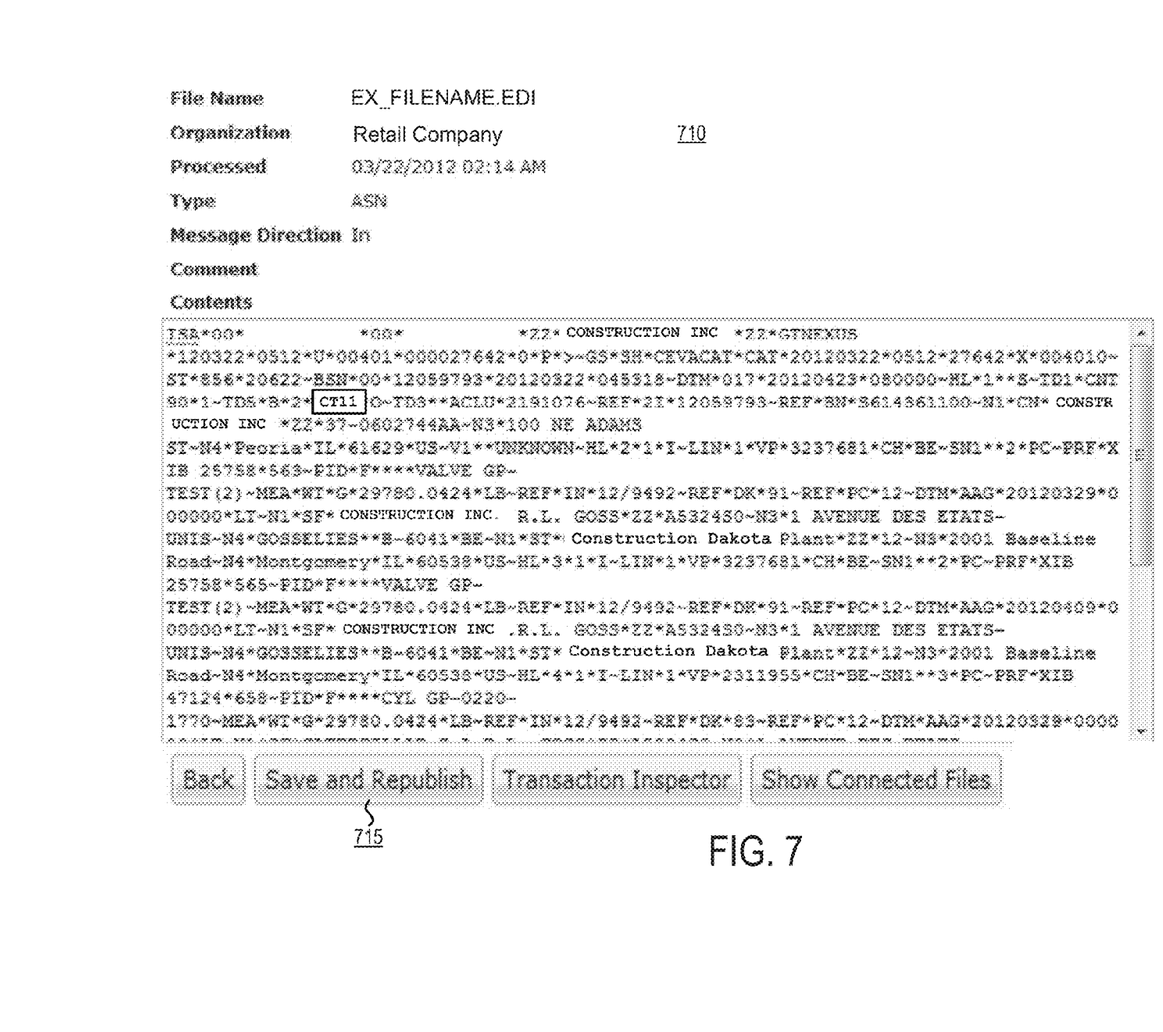
FIG. 7 illustrates another exemplary file that is received into the cloud based supply transaction service according to one embodiment.

FIG. 7 illustrates an exemplary file 710 that is received into the cloud based supply chain transaction service 125. Unlike the file 310, the file 710 is not a batch file. Rather, the file 710 is a single ASN. The file 710 is processed in the message integration pipeline, however, an error is experienced during the processing of the file 710. In one embodiment, a participant (e.g., a sender of the ASN, the receiver of the ASN, or other interested participant that has visibility to that ASN), uses the integration dashboard 160 and the transaction inspector 164 to identify the error, and uses the file inspector 162 to correct the error.

FIG. 8 illustrates an exemplary integration dashboard and transaction inspector displayed for a particular participant according to one embodiment. For purposes of the example of FIG. 8, the Buyer B is the participant that launched the integration dashboard 800. The integration dashboard 800 includes several different fields including the transaction type 810, the sender 815, the receiver 820, the number of transactions of that type sent by that sender for that receiver that were successfully processed 825, a successfully processed graph 830 (e.g., a daily or weekly graph), the number of transactions of that type sent by that sender for that receiver that were rejected (experienced an error) 835, and a rejected processed graph 840. The data in the successfully processed field 825 and the rejected processed field 835 each include links that, when selected, launch the transaction inspector 164. As illustrated in FIG. 8, the integration dashboard 800 includes a summary of the processing results for several different transaction types including ASNs, airway bills, ISFs, and purchase orders, between several different participants.

A participant in the cloud based supply chain transaction service 125 may launch the integration dashboard for any number of reasons including following standard procedure (e.g., an administrator may launch the integration dashboard on a periodic schedule such as one or more times a day, weekly, etc.) and/or whenever the participant thinks there may be an issue. In one embodiment, the integration dashboard is launched as a result of the participant logging into the system and selecting a link for the integration dashboard. In one embodiment, upon the link being selected, the integration dashboard 160 automatically retrieves the records in the message data structure 142 that are marked as being visible to that participant, aggregates the results (e.g., by message type, sender, and/receiver), and presents the information to the participant. In this way, the information that is displayed to the participant through the integration dashboard 160 reflects the most recent data. In one embodiment, the integration dashboard 160 allows the participant to restrict their results by a certain date, message type, and/or participant.

By way of example, consider the scenario where the participant Buyer B is waiting for a shipment of components that are to be carried by the Carrier A participant; however their records do not show an arrival date for the components. The participant Buyer B may launch the integration dashboard to view the results screen 800, which indicates that there are 11 rejected ASNs sent by the Carrier A and destined for the Buyer B. The participant Buyer B may select a link associated with the 11 rejected ASNs (e.g., the link 845, which is hyperlinked to the number 11) to view further details about why the ASNs had an error during processing. Responsive to selecting the link 845, the transaction inspector 164 is launched and displays details regarding those 11 rejected ASNs.

For example, selection of the link 845 causes the transaction inspector results screen 850 to be displayed. For purposes of explanation, only one record is displayed in the results screen 850, however there may be records for each of the 11 ASNs that were rejected. In some cases, each of the ASNs may be rejected for similar reasons (e.g., having the same error) or for different reasons. The results screen 850 includes several different fields including the file name 855, the received date/time 860, the status 865, the references 870, the transaction type 875, the reason text 880, and details 885. The references field 870 includes reference data from the transaction (e.g. a container number) which is logged to the message data structure at the time the message is processed. The reason text field 880 provides a reason why the ASN was rejected. In this example, a shipment identifier was submitted for being replaced, but the carrier code that was included in the file was not found in the system. The system may need to be updated (e.g., the application rules may need to be updated to include the carrier code), or the carrier code that was entered in the file may simply be the wrong code. The file name field of the record 855 includes the file name of the underlying file of the ASN and is linked to the file such that if selected, the file is retrieved and displayed (e.g., through the file inspector 162). The details field 885 provides a link, which when selected, causes more details regarding the transaction (e.g., there may be multiple errors experienced for a single transaction, which can be viewed through the details).

The participant may contact the originator of the message (e.g., the Carrier C) to correct the issue after identifying the error (e.g., by email or phone with the file name and error message). This may be the recourse the participant takes if they are unsure how to correct the issue. For example, with the information provided by the participant Buyer B, the carrier C may determine how to correct the issue. For example, if the wrong carrier code was input into the ASN, the carrier may use the file inspector and search for the filename of the ASN (provided by the Buyer B), correct the carrier code, and republish the ASN into the system. As another example, if the carrier code was correct in the ASN but was not properly mapped in the application rules, the carrier may update the application rules accordingly and republish the ASN.

If the participant identifies the error and knows how to correct the issue, then the participant may correct the issue, even if they were not the participant that caused the error or created the file. For example, assuming for the purposes of this example that the Buyer B knew that the carrier code (CT11) included in the file was entered incorrectly (e.g., it was supposed to be CT1), the Buyer B may view the file using the file inspector, edit the carrier code, and republish the file with the correct carrier code. For example, responsive to selecting the link associated with the file name of the ASN, the file inspector 162 is launched and automatically retrieves the corresponding ASN file 710. The Buyer B can edit the carrier code (emphasized in FIG. 7 with a box) to be the correct carrier code, and select the save and republish button 715 to cause the modified file to be republished. As previously described, the modified file may be published in place at the particular stage where it experienced an error. In this case, the error occurred during the application stage. As such, the file may be published at the application stage.

As illustrated in FIG. 8, the transaction inspector also includes a republish button 890 that when selected, causes the files displayed in the transaction inspector to be republished. By way of example, multiple error conditions may be caused by the same underlying issue. For example, if the carrier code was correct in the ASN but was not properly mapped in the application rules, there may be multiple ASNs that had the same error. Once the error is fixed in the system, future ASNs with that carrier code will not experience the error (even if the ASN is directed to a different recipient). However, the ASNs that have already been processed may have experienced that error. Instead of fixing each ASN individually (which is an option), once the underlying issue is corrected, the user can use the transaction inspector 164 to find ASNs that have been processed that have the same issue and select the republish button 890 to cause those ASNs to be republished. Since the underlying issue is corrected, those ASNs should process correctly or at least will not experience the same error.

Thus, with embodiments described herein, participants of a supply chain transaction such as a shipping transaction may quickly self-identify and correct issues that occur during processing of the data related to the supply chain transaction. Unlike traditional methods and systems where only the sender of the data or an administrator of the cloud system could identify the information, which was often a time consuming process, embodiments described herein allow any participant that has visibility into a particular message to identify the error so that the error may be corrected more quickly. Also, unlike traditional methods and systems that require messages to be resubmitted in its original state (and often from the sender's system), embodiments described herein allow messages to be changed in place and resubmitted directly from the cloud system.

In some embodiments, participants self provision the integrations. For example, the participants may use a message configuration tool provided by the service 125 to establish the connections between the supply chain management applications of the participants and the service 125. The message configuration tool may allow the participant to select a template for commonly used files (e.g., ASNs, Bill of Ladings, POs, Air Freight, etc.), and select the participant(s) to self provision the integrations to new partners that have already established integrations for those message types.

The participant may use the file drop module 155 to upload files to the message integration pipeline. The file drop module 155 may be used to drag files and drop them into the message integration pipeline and/or allows users to specify the files through the interface. In some embodiments, the file drop module 155 is used to test the integrations. The files are processed in the message integration pipeline in a similar way as the files are received via the supply chain management applications. The participant may use the transaction inspector 164 to view the results of the processing to determine whether there are any errors and may correct any errors and test the file again.

Figure 9:
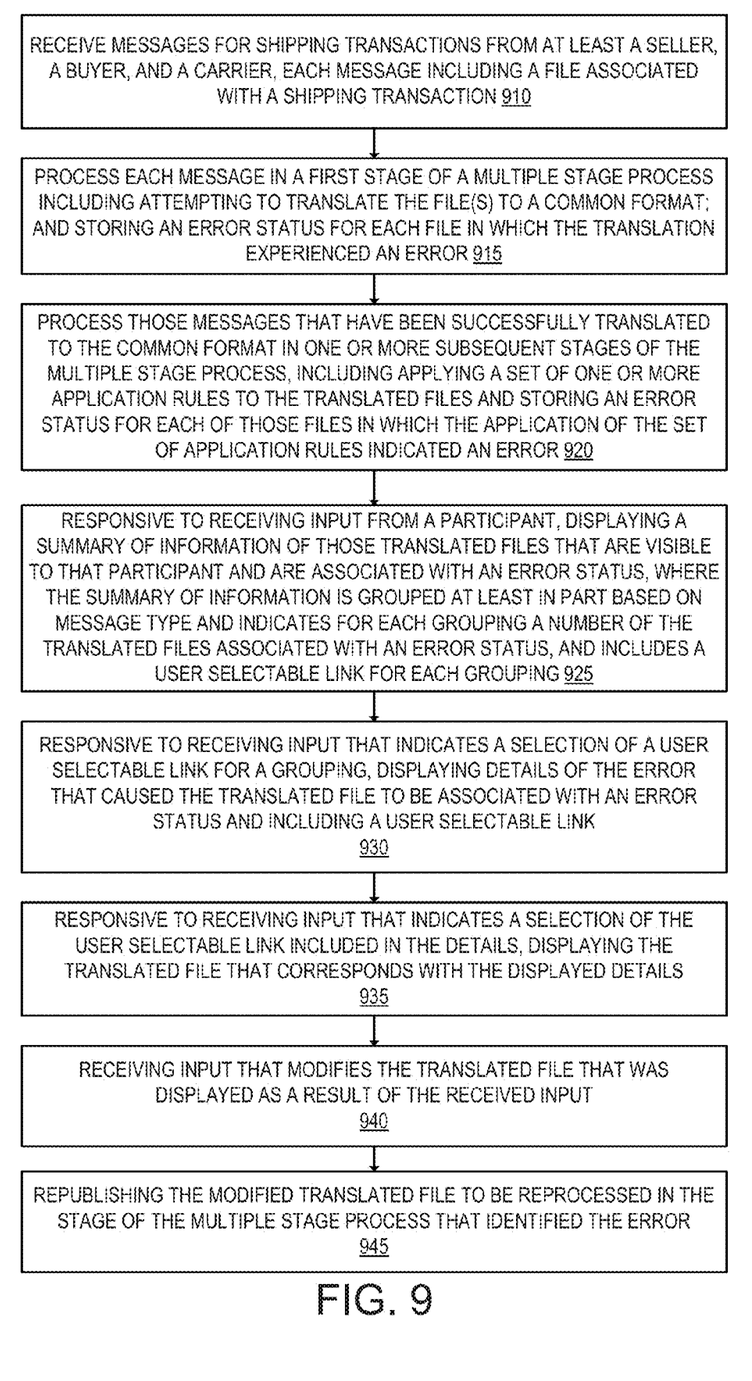
FIG. 9 is a flow diagram that illustrates exemplary operations for locating and fixing an error according to one embodiment.

FIG. 9 is a flow diagram that illustrates exemplary operations for locating and fixing an error according to one embodiment. FIG. 9 will be described with reference to the exemplary embodiment of FIG. 1. However, it should be understood that the operations of FIG. 9 can be performed by embodiments other than those discussed with reference to FIG. 1, and the embodiments discussed with reference to FIG. 1 can perform operations different than those discussed with reference to FIG. 9.

At operation 910, the integration manager 130 receives messages for shipping transactions from at least a seller, a buyer, and a carrier. Each message includes at least one file associated with a shipping transaction; however some of the files may be a batch file that include multiple files (e.g., a file with multiple POs). At least some of the received messages are in a different format and have different terminology for the same data information type. For example, the messages may be received from different supply chain management applications, different versions of the supply chain management applications, etc. Flow then moves to operation 915.

At operation 915, the integration manager 130 processes the messages in a first stage of a multiple stage process, including attempting to translate the file(s) in each message to a common format. For example, the translation module 144 attempts to translate the file(s) according to the translation rules 146 to a common format (e.g., into an XML format). For those files that cannot be translated due to an error or those files that otherwise experienced an error, an error status is stored (e.g., in the message data structure 142) for each file in which the translation experienced an error. Flow moves from operation 915 to operation 920.

At operation 920, the integration manager 130 processes those messages that have been successfully translated to the common format in one or more subsequent stages of the multiple stage process. For example, the application 148 applies a set of one or more application rules 150 to the translated file. For those translated files that experience an error due to the application of the application rules, an error status is stored for those files (e.g., in the message data structure 142). Flow moves from operation 920 to operation 925.

At operation 925, responsive to receiving input from a participant (e.g., the seller, the buyer, the carrier, or other participant), a summary of information of those translated files that are visible to that participant and are associated with an error status are displayed. For example, the integration dashboard 160 displays the summary of information in response to a user selecting a link to launch the integration dashboard 160. In one embodiment, the participant does not have to specify the error type (e.g., they do not have to generate a custom query, or in fact know that an error has occurred), type of message, and/or partner, as a requirement of viewing the summary information. The summary of information is grouped at least in part based on message type (it may also be grouped based on sender of the file and/or the received of the file). Each grouping indicates a number of the translated files that are associated with an error status. Also, each record in the summary of information includes a user selectable link, that when selected, causes details regarding the error to be displayed. Flow moves from operation 925 to operation 930.

At operation 930, responsive to receiving input from the participant that indicates a selection of the user selectable link for a grouping, for each of the translated files associated with an error status for that grouping, details of the error are displayed. For example, selection of a link displayed on a record of the summary of information by the integration dashboard 160 causes the transaction inspector 164 to be launched and display, for each of the translated files associated with an error status for that grouping, displays regarding the reasons for the error. The displayed details also includes a user selectable link, that when selected, causes the translated file to be retrieved and displayed. Flow moves from operation 930 to operation 935.

At operation 935, responsive to receiving input that indicates a selection of the link in the displayed details, the translated file that corresponds with that link is retrieved and displayed. For example, the file inspector 162 is launched and retrieves the translated file. The file inspector 162 includes a text editor that allows the participant to view and modify the file. Flow then moves to operation 940, where input is received that modifies the translated file that is displayed. For example, the participant locates the error in the file, and uses the file inspector 162 to modify the file to correct the issue.

Flow then moves to operation 945, where the modified translated file is republished to be reprocessed in the stage of the multiple stage process that identified the error. For example, the participant selects the save and republish button on the file inspector 164 that publishes the modified file, in place.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for improved data quality in a cloud based shipping transaction integration system, comprising:
   receiving a plurality of messages for a plurality of shipping transactions from a plurality of participants of the shipping transactions, wherein each of the plurality of messages includes a file associated with one of the shipping transactions, wherein at least some of the messages have a different format and have different terminology for a same data information type, and wherein the plurality of participants include at least a seller, a buyer, and a carrier;
   processing each of the received messages in a first stage of a multiple stage process, wherein processing in the first stage includes performing the following:
      for each file of each message, attempting to translate that file to generate a translated file that is in a common format, and
      storing an error status for each file in which the translation experienced an error;
   processing, in a set of one or more subsequent stages of the multiple stage process, each of those files of the received messages that has successfully been translated to the common format, wherein processing in the set of subsequent stages includes performing the following:
      applying a set of one or more application rules to each of the translated files, and
      storing an error status for each of those translated files in which the application of the set of application rules indicated an error;
   responsive to receiving a first input from a first one of the participants, displaying a summary of information of those translated files that are visible to the first participant and are associated with an error status, wherein the summary information is grouped at least in part based on message type and indicates for each grouping a number of the translated files associated with an error status, and wherein the summary of information includes a user selectable link for each grouping;
   responsive to receiving a second input from the first one of the participants that indicates a selection of a user selectable link for a grouping, for each of the number of translated files associated with an error status for that grouping, displaying details of the error that caused that translated file to be associated with an error status and including a user selectable link;
   responsive to receiving a third input from the first one of the participants that indicates a selection of a user selectable link included in the displayed details, displaying, in a text editor, the translated file that corresponds with the displayed details;
   receiving, through the text editor, a fourth input from the first one of the participants that modifies the translated file that was displayed as a result of the received third input; and
   republishing the modified translated file to be reprocessed in the stage of the multiple stage process that identified the error.

2. The method of claim 1, wherein at least some of the messages received from the plurality of participants include a plurality of files each of which is associated with a different shipping transaction, and wherein the processing of these messages in the first stage further includes separating each of those plurality of files into separate files prior to the step of attempting to translate the files.

3. The method of claim 1, wherein processing in the first stage further includes performing the following for each received file:
   associating the file with an identifier of those ones of the plurality of participants that the file is visible to.

4. The method of claim 1, wherein processing in the set of subsequent stages further includes performing the following for each translated file:
   associating the translated file with an identifier of those ones of the plurality of participants that the translated file is visible to.

5. The method of claim 1, wherein the first input does not specify an error condition.

6. The method of claim 1, wherein the summary information is further grouped based on a sender and a receiver of those translated files that are visible to the first participant.

7. The method of claim 6, wherein the modified translated file that is modified as a result of receiving input from the first one of the participants did not originate with that participant.

8. An apparatus for improved data quality in a collaborative cloud based shipping transaction integration system, comprising:
- a processor to execute instructions; and
- a non-transitory computer-readable storage medium that stores the instructions to be executed by the processor including instructions for the following:
  - a message pipeline module configured to receive a plurality of messages for a plurality of shipping transactions from a plurality of participants of the shipping transactions and cause the received messages to be processed in multiple stage process, wherein each of the received messages includes a file associated with one of the shipping transactions, wherein at least some of the messages have a different format and have different terminology for a same data information type, and wherein the plurality of participants include at least a seller, a buyer, and a carrier;
  - a translation module, coupled with the message pipeline module, that is configured to perform the following:
    - attempt to translate the received messages into a common format, and cause an error status to be stored in a message data structure for each message in which the translation experienced an error;
  - an application module, coupled with the message pipeline module, that is configured to perform the following:
    - apply a set of one or more application rules to each of the translated messages, and
    - cause an error status to be stored in the message data structure for each message in which the application of the set of application rules indicated an error;
  - an integration dashboard that is configured to perform the following:
    - in response to receipt of input from a first one of the participants, display a summary of information of those of the messages that are visible to the first participant and are associated with an error status, wherein the summary of information is grouped at least in part based on message type and indicates for each grouping a number of the messages associated with an error status, and wherein the summary of information includes a user selectable link for each grouping, that when selected, launches a transaction inspector;
  - the transaction inspector that is configured to perform the following in response to being launched as a result of one of the participants selecting a user selectable link for a grouping:
    - display details for each of the number of translated files associated with an error status for that grouping, wherein the displayed details includes a user selectable link, that when selected, launches a file inspector; and
  - the file inspector that is configured to perform the following in response to being launched as a result of one of the participants selecting a user selectable link included in the displayed details of the transaction inspector:
    - display, in a text editor, the translated file that corresponds with the displayed details;
    - receive input, through the text editor, that modifies the translated file; and
    - republish the modified translated file to be reprocessed in the stage of the multiple stage process that identified the error.

9. The apparatus of claim 8, wherein at least some of the messages that are to be received from the plurality of participants include a plurality of files each of which is associated with a different shipping transaction, and wherein the translation module is further configured to separate each of those files into separate files prior to attempting to translate those files.

10. The apparatus of claim 8, wherein the translation module is further configured to associate each file with an identifier of those ones of the plurality of participants that that file is visible to.

11. The apparatus of claim 8, wherein the application module is further configured to associate each translated file with an identifier of those ones of the plurality of participants that that translated file is visible to.

12. The apparatus of claim 8, wherein the integration dashboard is launched without receiving a specification of an error condition.

13. The apparatus of claim 8, wherein the summary of information is further grouped based on a sender and a receiver of those translated files that are visible to the first participant.

14. The apparatus of claim 13, wherein the modified translated file did not originate with the first participant.

15. A non-transitory computer-readable storage medium that provides instructions that, if executed by a processor, will cause said processor to perform operations comprising:
- receiving a plurality of messages for a plurality of shipping transactions from a plurality of participants of the shipping transactions, wherein each of the plurality of messages includes a file associated with one of the shipping transactions, wherein at least some of the messages have a different format and have different terminology for a same data information type, and wherein the plurality of participants include at least a seller, a buyer, and a carrier;
- processing each of the received messages in a first stage of a multiple stage process, wherein processing in the first stage includes performing the following:
- for each file of each message, attempting to translate that file to generate a translated file that is in a common format, and
- storing an error status for each file in which the translation experienced an error;
- processing, in a set of one or more subsequent stages of the multiple stage process, each of those files of the received messages that has successfully been translated to the common format, wherein processing in the set of subsequent stages includes performing the following:
- applying a set of one or more application rules to each of the translated files, and
- storing an error status for each of those translated files in which the application of the set of application rules indicated an error;
- responsive to receiving a first input from a first one of the participants, displaying a summary of information of those translated files that are visible to the first participant and are associated with an error status, wherein the summary information is grouped at least in part based on message type and indicates for each grouping a number of the translated files associated with an error status, and wherein the summary of information includes a user selectable link for each grouping;
- responsive to receiving a second input from the first one of the participants that indicates a selection of a user selectable link for a grouping, for each of the number of translated files associated with an error status for that grouping, displaying details of the error that caused that translated file to be associated with an error status and including a user selectable link;

responsive to receiving a third input from the first one of the participants that indicates a selection of a user selectable link included in the displayed details, displaying, in a text editor, the translated file that corresponds with the displayed details;

receiving, through the text editor, a fourth input from the first one of the participants that modifies the translated file that was displayed as a result of the received third input; and republishing the modified translated file to be reprocessed in the stage of the multiple stage process that identified the error.

16. The non-transitory computer-readable storage medium of claim 15, wherein at least some of the messages received from the plurality of participants include a plurality of files each of which is associated with a different shipping transaction, and wherein the processing of these messages in the first stage further includes separating each of those plurality of files into separate files prior to the step of attempting to translate the files.

17. The non-transitory computer-readable storage medium of claim 15, wherein processing in the first stage further includes performing the following for each received file:
associating the file with an identifier of those ones of the plurality of participants that the file is visible to.

18. The non-transitory computer-readable storage medium of claim 15, wherein processing in the set of subsequent stages further includes performing the following for each translated file:
associating the translated file with an identifier of those ones of the plurality of participants that the translated file is visible to.

19. The non-transitory computer-readable storage medium of claim 15, wherein the first input does not specify an error condition.

20. The non-transitory computer-readable storage medium of claim 15, wherein the summary information is further grouped based on a sender and a receiver of those translated files that are visible to the first participant.

21. The non-transitory computer-readable storage medium of claim 20, wherein the modified translated file that is modified as a result of receiving input from the first one of the participants did not originate with that participant.

* * * * *